A. P. Critchlow,
Picture Case.
No. 456. Reissued Apr. 21, 1857.
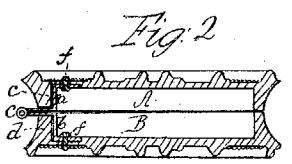
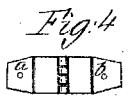
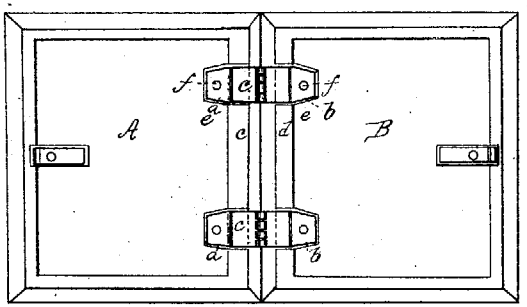
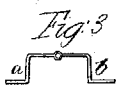
AM. PHOTO-LITHO. CO. N.Y. (OSBORNE'S PROCESS)

UNITED STATES PATENT OFFICE.

ALFRED P. CRITCHLOW, OF FLORENCE, MASSACHUSETTS, ASSIGNOR TO ALFRED P. CRITCHLOW & CO.

HINGE FOR PICTURE-CASES.

Specification forming part of Letters Patent No. 15,915, dated October 14, 1856; Reissue No. 456, dated April 21, 1857.

*To all whom it may concern:*

Be it known that I, ALFRED P. CRITCHLOW, of Florence, in the county of Hampshire and State of Massachusetts, have invented an Improvement in Connecting the Two Halves or Parts of Daguerreotype or Picture Cases; and I do hereby declare that the same is fully described and represented in the following specification and the accompanying drawings, of which—

Figure 1 represents a daguerreotype or picture case entirely open and having its two parts united together by hinges of my improved kind. Fig. 2 is a longitudinal section of the case, such being taken through one of its hinges. Fig. 3 is a side view of one of the hinges. Fig. 4 is a top view of it.

The kind of daguerreotype or picture case for which I have particularly devised my improvement is that which is common and well-known as being made of composition, which when heated and in a soft state is pressed into a mold in order to form either half of the case. Now, this composition is usually composed of various materials well known to those whose business it is to manufacture such cases.

In the drawings, A and B exhibit the two halves of a picture-case of such description, they being united together by hinges C C. Each of these hinges is constructed of two leaves, *a b*, each of which is bent twice at a right angle, and so that when the hinge is applied to the two parts of the case it may extend entirely across the two sides *c d*, and thence down the inner surfaces of said sides, and thence a short distance therefrom, and so as to extend into, over, or lap upon the inner surfaces, *e e*, of the case, as shown in the drawings, so that rivets *f f* may be passed through such extension and the top and bottom plates of the box, in order to secure the hinge in place or fasten it to the said parts A B.

When a hinge is so made and applied, it is not fastened to what may be termed the "sides" of the box, but entirely independent thereof, or has no projection or tenon to enter the same, and therefore the strain on the hinge during the act of opening and shutting the box, especially when the hinge has a close or not loose joint, is completely removed from the sides of the box, so that it is not liable to break them or displace the hinge, as often occurs when the leaf of the hinge is bent only once and inserted in a mortise made in the side of the box or is fastened to the sides, or has a projection or tenon extended from it or from below it into the said side. Besides this, the improved hinge so embraces the contiguous sides of the box that it has a great extent of bearing-surface, and thereby it prevents the box from being injured by a leverage or strain, which is often brought upon the hinge after the halves of the box have been opened into one plane and into contact with each other.

I do not claim a hinge of common construction, or one having each of its leaves either bent at a right angle or provided with a tenon or projecting part, so that it may be inserted in a mortise made in the side of a case or box; but What I do claim is—

My improvement in the application of a hinge of a daguerreotype or picture case molded of plastic material or made of a frangible substance or substances, such hinge being made with each of its leaves bent twice, as set forth, and so applied to the halves of the box that it may not only embrace two contiguous sides of such halves and be independent thereof, or not have any tenon or projection to enter the same, but may extend or lap over and be fastened to the top and bottom plates of said box, substantially as described.

In testimony whereof I have hereunto set my signature.

A. P. CRITCHLOW.

Witnesses:

RUFUS SACKETT,

A. W. THAYER.